US009846697B2

(12) United States Patent
Goo et al.

(10) Patent No.: US 9,846,697 B2
(45) Date of Patent: *Dec. 19, 2017

(54) INDEXING DATA UPDATES ASSOCIATED WITH AN ELECTRONIC CATALOG SYSTEM

(71) Applicant: Amazon Technologies, Inc., Seattle, WA (US)

(72) Inventors: Almann T. Goo, Bellevue, WA (US); Michael J. McInerny, Seattle, WA (US)

(73) Assignee: Amazon Technologies, Inc., Seattle, WA (US)

(*) Notice: Subject to any disclaimer, the term of this patent is extended or adjusted under 35 U.S.C. 154(b) by 244 days.

This patent is subject to a terminal disclaimer.

(21) Appl. No.: 14/698,557

(22) Filed: Apr. 28, 2015

(65) Prior Publication Data
US 2015/0242413 A1 Aug. 27, 2015

Related U.S. Application Data

(63) Continuation of application No. 13/278,041, filed on Oct. 20, 2011, now Pat. No. 9,043,311.

(51) Int. Cl.
G06F 17/30 (2006.01)

(52) U.S. Cl.
CPC .. *G06F 17/30073* (2013.01); *G06F 17/30312* (2013.01); *G06F 17/30336* (2013.01); *G06F 17/30864* (2013.01); *G06F 2201/80* (2013.01)

(58) Field of Classification Search
CPC combination set(s) only.
See application file for complete search history.

(56) References Cited

U.S. PATENT DOCUMENTS

| 6,728,852 | B1 | 4/2004 | Stoutamire |
| 6,813,777 | B1 | 11/2004 | Weinberger et al. |
| 7,200,603 | B1 | 4/2007 | Hitz et al. |
| 7,249,356 | B1 | 7/2007 | Wilson et al. |
| 7,257,689 | B1 | 8/2007 | Baird |
| 7,257,690 | B1 | 8/2007 | Baird |
| 7,555,503 | B1 | 6/2009 | Neal et al. |
| 7,698,258 | B2 | 4/2010 | Hoffman et al. |
| 7,752,195 | B1 | 7/2010 | Hohwald et al. |
| 7,752,286 | B2 | 7/2010 | Anderson et al. |
| 8,364,648 | B1 | 1/2013 | Sim-Tang |
| 8,442,950 | B2 | 5/2013 | D'Souza et al. |
| 2001/0042131 | A1 | 11/2001 | Mathon et al. |
| 2003/0177503 | A1* | 9/2003 | Sull ................ G06F 17/30796 725/112 |
| 2003/0191737 | A1 | 10/2003 | Steele et al. |
| 2004/0220926 | A1* | 11/2004 | Lamkin ............ G06F 17/30017 |
| 2005/0193029 | A1 | 9/2005 | Rom et al. |
| 2006/0026194 | A1 | 2/2006 | Bhushan et al. |
| 2006/0053304 | A1 | 3/2006 | Fries et al. |

(Continued)

Primary Examiner — Shyue Jiunn Hwa
(74) Attorney, Agent, or Firm — Knobbe, Martens, Olson & Bear, LLP

(57) ABSTRACT

Systems and methods are provided for efficiently indexing archived objects in an archive data store to allow for efficient and quick access to the archived objects. The systems and methods provided also allow alleviate the strain on a live data store and enable a requester wishing to retrieve updates to do so without knowledge of the location of the stored update on a live or archive data store.

17 Claims, 7 Drawing Sheets

(56) References Cited

U.S. PATENT DOCUMENTS

| | | | |
|---|---|---|---|
| 2007/0016563 A1* | 1/2007 | Omoigui | G06F 17/3061 |
| 2007/0022149 A1 | 1/2007 | Bacon et al. | |
| 2007/0061266 A1 | 3/2007 | Moore et al. | |
| 2007/0288490 A1 | 12/2007 | Longshaw | |
| 2008/0072290 A1 | 3/2008 | Metzer et al. | |
| 2008/0263007 A1* | 10/2008 | Schmidt | G06F 17/30383 |
| 2009/0006447 A1 | 1/2009 | Balmin et al. | |
| 2009/0037514 A1 | 2/2009 | Lankford et al. | |
| 2010/0114837 A1 | 5/2010 | Prahlad et al. | |
| 2010/0217750 A1 | 8/2010 | Tokoro et al. | |
| 2010/0257151 A1 | 10/2010 | Lohman et al. | |
| 2010/0333116 A1 | 12/2010 | Prahlad et al. | |
| 2011/0083088 A1 | 4/2011 | Cisler et al. | |
| 2012/0047212 A1 | 2/2012 | Adams et al. | |

\* cited by examiner

INDEXING DATA UPDATES ASSOCIATED WITH AN ELECTRONIC CATALOG SYSTEM

CROSS-REFERENCE TO RELATED APPLICATION

This application is a continuation of U.S. patent application Ser. No. 13/278,041, entitled INDEXING DATA UPDATES ASSOCIATED WITH AN ELECTRONIC CATALOG SYSTEM, and filed Oct. 20, 2011, the entirety of which is incorporated by reference herein.

BACKGROUND

Electronic catalog servers, such as those associated with large e-commerce sites, often store large quantities of catalog data to which updates are frequently made. The quantity of updates received over an extended period of time, such as several months or years, may be too large to enable the updates to be conveniently managed in a single, live data store. Therefore, a portion of the stored updates may be deleted from the live data store and moved to archive storage systems.

Users and administrators of electronic catalog systems often need to access the updates made to the catalog data, for various troubleshooting or marketing purposes. In order to facilitate access to the updates, there may be live or dynamic indexing performed on the live data store. However, such dynamic indexing may affect the throughput and performance of the electronic catalog systems, and may also require increasingly larger storage space for the dynamic index over time.

BRIEF DESCRIPTION OF THE DRAWINGS

The foregoing aspects and many of the attendant advantages will become more readily appreciated as the same become better understood by reference to the following detailed description, when taken in conjunction with the accompanying drawings, wherein.

DETAILED DESCRIPTION

Figure 1:
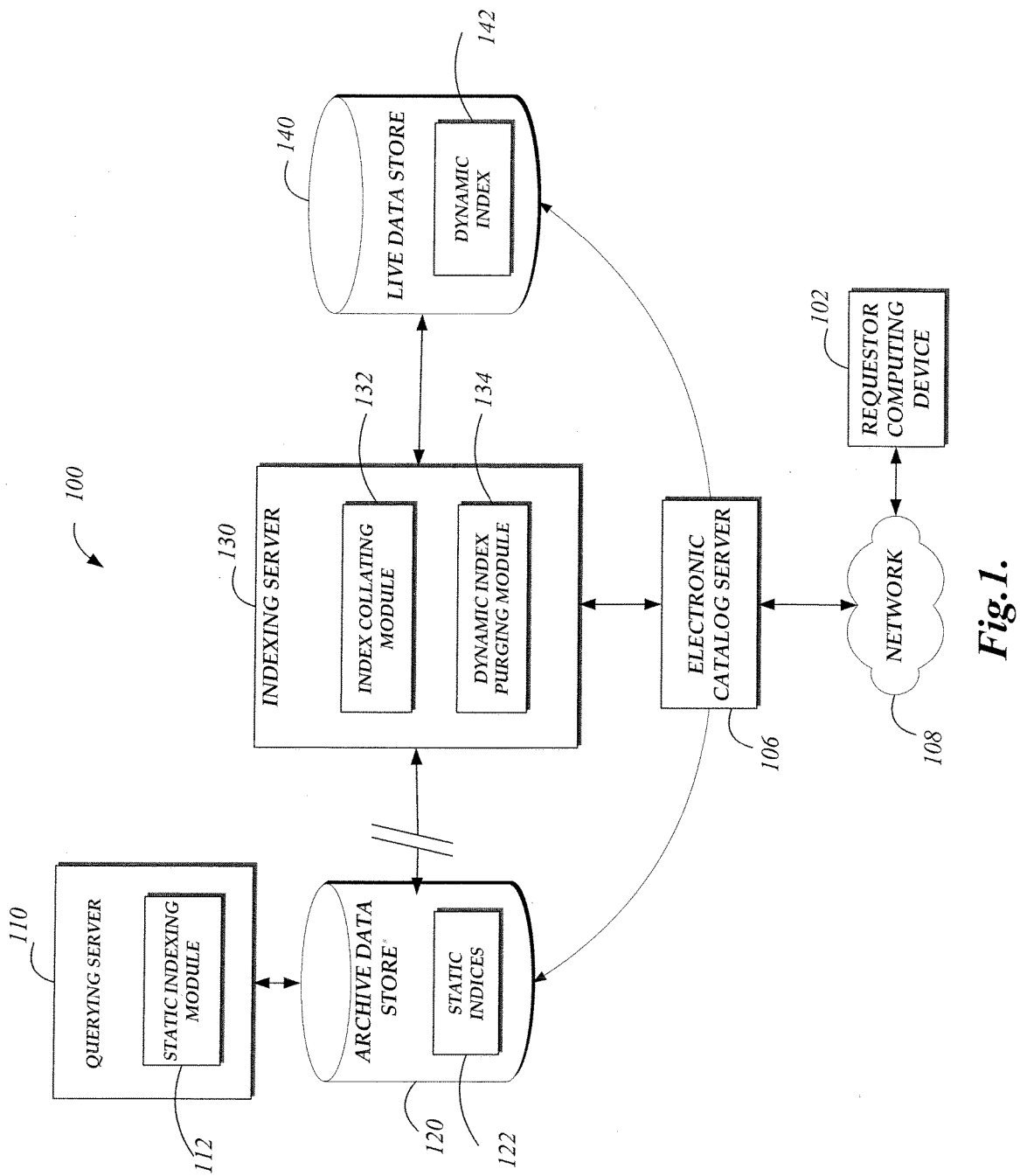
FIG. 1 is a block diagram depicting an illustrative operating environment including a querying server and an indexing server for indexing data updates to an electronic catalog.

An electronic catalog server may host an electronic catalog of a variety of items available from various providers. The electronic catalog server may also provide functionality for users to acquire the items found in the electronic catalog. For example, the electronic catalog server may be part of an electronic commerce ("e-commerce") site that hosts an electronic catalog of many millions of items offered for sale or otherwise made available by numerous retailers, sellers, vendors, merchants, etc. (collectively and interchangeably referred to herein as "merchants"). One example of such an e-commerce site is described in U.S. Pat. No. 7,600,682, entitled "Marketplace System in Which Users Generate Preorder Listings Via a Definitive Product Catalog," and issued on Oct. 13, 2009. Other examples of electronic catalog servers include product review sites, video/movie rental sites, and video sharing sites.

In the example of an e-commerce site, the items available through the electronic catalog may have item data associated with them, where the item data may include one or more of price, availability, title, item identifier, item feedback (e.g., user reviews, ratings, etc.), item image, item description, and various other item attributes. The item data associated with an item may range from a few kilobytes to a few megabytes in size. The item data may be updated at various points in time, and the updates may come from various sources of item data (manufactures, sellers, retailers, other components of the electronic catalog system, etc.).

In many circumstances, a user of, an administrator of, or an application in communication with, the electronic catalog server may have a need to analyze the updates associated with a particular catalog item or group of catalog items. For example, an administrator may wish to review the updates associated with a particular item to pinpoint the source of erroneous catalog data. As another example, a merchant, analyst, or other entity may wish to analyze the price histories of particular items. In order to analyze the complete history of items, access must be provided to not only the latest updates to those items, as would be stored in a live data store, but also to the historical updates which may have been moved to an archive data store. Having an indexing scheme providing transparent access to the objects (or pointers to the updates stored in the archive data store) as well as to the updates in the live data store, allows quick response to queries from such users, administrators and applications, without affecting the performance of the electronic catalog server.

Generally described, aspects of the present disclosure relate to a system in which in the updates to an electronic catalog are organized into objects consisting of collections of records, and the objects are archived. The objects may have pointers, keys, and values associated with the records within them. The system may, in some embodiments, be used to efficiently index the archived objects to allow for relatively quick access to the pointers of the records, or if requested, retrieval of the records within the objects. The indexing scheme provided by the system also allows the periodic purging of the updates indexed by a dynamic indexing system which alleviates the strain on the live data store, thereby improving the performance of the electronic catalog server. The indexing systems and methods provided also enable a requester wishing to retrieve updates associated with an item from the electronic catalog to do so without knowledge of the location of the stored update. In other words, whether the update is stored in the live data store or the archive data store, the requester submits one request to the system, and transparently receives updates or pointers to updates located on both stores.

FIG. 1 is a block diagram depicting an illustrative operating environment 100 including a querying server 110 and an indexing server 130 for indexing data updates to an electronic catalog available through an electronic catalog server 106. The electronic catalog server 106 may, in some embodiments, be part of an e-commerce site that provides functionality for users to interactively browse and make purchases from the electronic catalog. Administrators may also access the electronic catalog server 106 to perform routine maintenance, or other administrative tasks, including gathering information regarding updates to the electronic catalog. Such users and administrators may remotely access the electronic catalog server 106 and browse the electronic catalog using various types of requestor computing devices 102 (one shown). In some embodiments, the requestor computing device 102 may be an application connected to the electronic catalog server to retrieve information regarding updates to the electronic catalog. The requestor computing devices 102 may be any of a number of types of computing devices that are capable of communicating over a network including, but not limited to, a laptop, personal computer, server computer, tablet computer, personal digital assistant (PDA), hybrid PDA/mobile phone, mobile phone, smartphone, electronic book reader, digital media player, and the like.

In the environment shown in FIG. 1, the requestor computing devices 102 may communicate with the electronic catalog server 106 via a communication network 108, such as the Internet or other communications link. Those skilled in the art will appreciate that the network 108 may be any wired network, wireless network, or combination thereof. In addition, the network 108 may be a personal area network, local area network, wide area network, cable network, satellite network, cellular telephone network, etc. or combination thereof. Protocols and components for communicating via the Internet or any of the other aforementioned types of communication networks are well known to those skilled in the art of computer communications and, thus, need not be described in more detail herein.

The electronic catalog server 106 may be connected to or in communication with an archive data store 120 and a live data store 140. The archive data store 120 and the live data store 140 may be local to electronic catalog server 106, they may be remote to the electronic catalog server 106, and/or they may be network-based services themselves. The archive data store 120 may be connected to, or in communication with querying server 110. A static indexing module 112 on the querying server 110 may generate one or more static indices 122 to index the updates stored on the archive data store 120. The static indices 122 may, in some embodiments, be stored on archive data store 120. In other embodiments, the static indices 122 may be stored on the querying server 110, or in another store or server illustrated in FIG. 1, or elsewhere, either locally or remotely.

The live data store 140 may include a dynamic index 142. The dynamic index 142 may be generated for the updates stored on the live data store 140. In the illustrated embodiment, both the archive data store 120 and the live data store 140 are connected to, or in communication with the indexing server 130. The indexing server 130 may include an index collating module 132 for collating the static indices 122 and the dynamic index 142. The indexing server 130 may also include a dynamic index purging module 134 to manage the size of the dynamic index 142.

FIG. 1 depicts a distributed computing environment comprising several computer systems that are interconnected using one or more computer networks. However, it will be appreciated by those skilled in the art that the environment 100 could equally operate within a computer system having a fewer or greater number of components than are illustrated in FIG. 1. Thus, the depiction of the operating environment 100 in FIG. 1 should be taken as illustrative and not limiting to the present disclosure. For example, the environment 100 could implement various Web services components and/or peer to peer network configurations to implement at least a portion of the processes.

In brief, the electronic catalog server 106 is generally responsible for providing an electronic catalog through a user interface in communication with various user devices, such as requestor computing device 102, via network 108. The electronic catalog provided by the electronic catalog server 106 may generate text and/or graphics, possibly organized as a user interface using hypertext transfer or other protocols in response to information requests received from the various requestor computing devices 102.

At various points in time, the items available through the electronic catalog system 106 may have updates associated with them. The updates may be received from various catalog update providers. As the updates are received, they may be stored in live data store 140, and indexed in real-time for easy retrieval. The dynamic index 142 may be stored in the live data store 140. As more updates are stored in the live data store, and/or over time, the updates may need to be archived and stored in archive data store 120. The archiving of the updates may be done in accordance with the systems and methods disclosed in U.S. patent application Ser. No. 13/278,017, entitled "ARCHIVING AND QUERYING DATA UPDATES ASSOCIATED WITH AN ELECTRONIC CATALOG SYSTEM," filed on Oct. 20, 2011, which is incorporated herein in its entirety (hereinafter, the "'017 application").

As disclosed in the '017 application, updates may be archived in collection of records, or objects, wherein each of the records within an object may have a key representing a value associated with the item that was updated, and a version associated with the value of the updated item. The collections of records of data may be grouped together based on time, size, or some other criteria. Records may, for example, be appended to one another until the collection reaches a predetermined size, such as, for example, about a hundred to several hundred megabytes (MB). In other embodiments, the records may be grouped together until a predetermined interval of time is reached. For example, records may be successively appended for fifteen minutes, one hour, one day, or any other predetermined interval of time deemed appropriate for relevance of the update to the querying system. After the predetermined size or interval of time is reached, the collection of records may optionally be compressed.

The objects may also have metadata associated with them, which allows for the static indexing of the records. Generally, metadata may include any data used to describe aspects or properties of a given object. For example, metadata may include information identifying the date of an object's creation, the identity of its creator, whether the object has any records associated with it, or other suitable information. In some embodiments, metadata may include information indicative of usage characteristics of an object, such as the total size of records associated with an object, access history of users with respect to an object and/or its associated records, or any other suitable information related to current or historical usage of an object. In one embodiment, each object may be associated with a respective unique identifier, which may be automatically assigned by the archive data store 120. Additionally, a pointer to each record within the object may be stored within the metadata or as a separate property or field of an object. In some other embodiments, a given object may include explicit references or pointers or other information corresponding to the records associated with a given object. By using the identifiers or pointers, it is possible to only decompress a specific record within the collections.

Once the updates are archived in archive data store 120, they can be indexed by the static indexing module 112 implemented by the querying server 110, as will be described in relation to FIG. 3 below. The static indexing module 112 may generate one or more static indices in the background and independently of activity on the electronic catalog server 106, and therefore without affecting the performance of the electronic catalog server 106. The one or more static indices 122 generated by the static indexing module 112 may then be stored in the archive data store 120, as illustrated in FIG. 1, or they may be stored on the querying server 110, or on another server or data store. The static indexing module 112 will also periodically update the one or more static indices 122, as described further below.

The live data store 140 stores item data updates received for items available on the electronic catalog, in real-time, as the updates are received. The updates may be received from a variety of sources, including, for example, from merchants wishing to sell or otherwise make items available to consumers, from administrators of the electronic catalog server 106, and from others. The updates may include one or more of a change in the item's price, availability, title, item identifier, item feedback (e.g., user reviews, ratings, etc.), item image, item description, item attributes, etc. The live data store 140 may include a dynamic index 142. The dynamic index 142 may be generated in real-time based on the updates received by the live data store 140.

Figure 4:
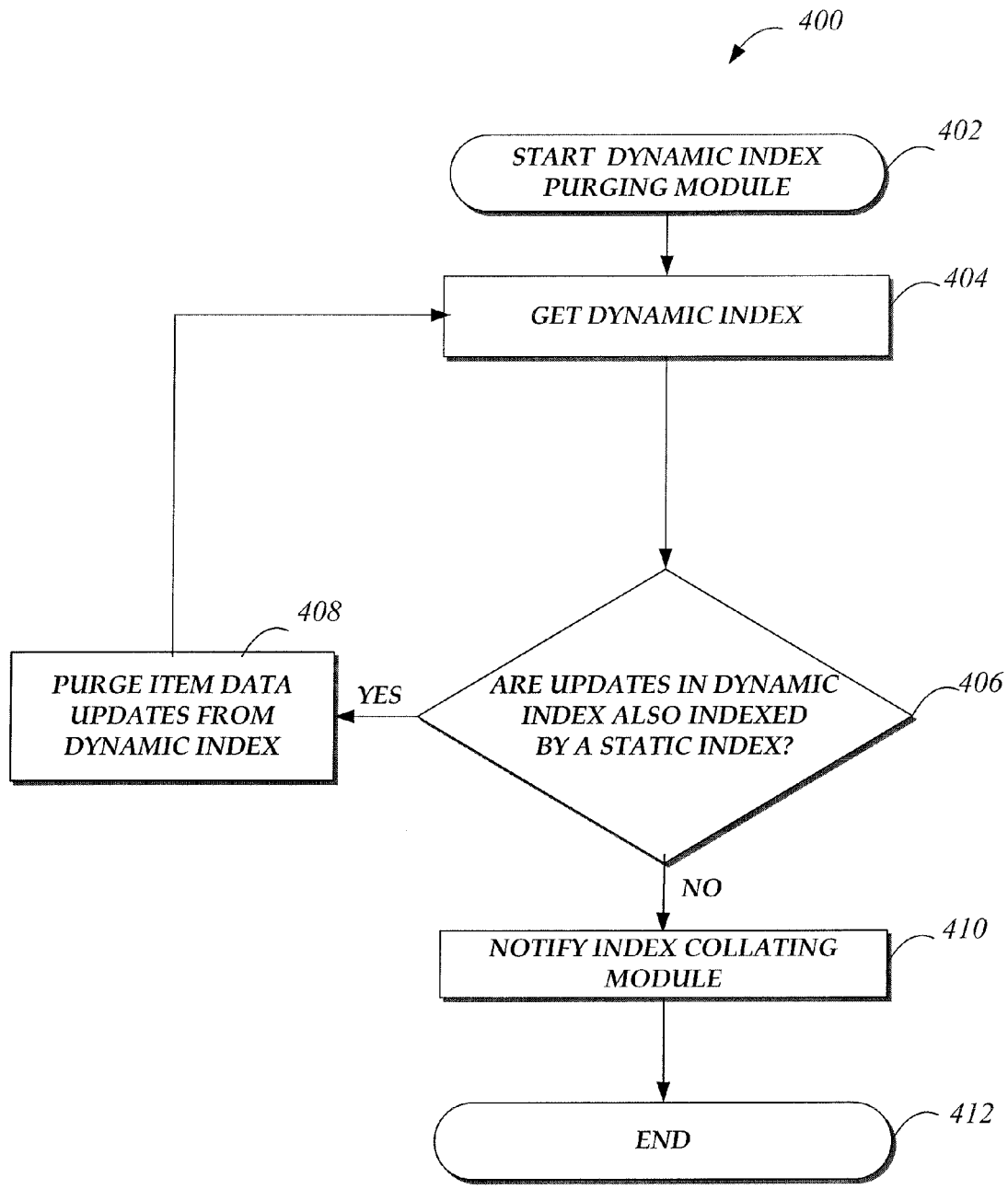
FIG. 4 is a flow diagram of an illustrative routine implemented by the indexing server for maintaining a dynamic index of data updates to an electronic catalog.

In the illustrated embodiment, the live data store 140 is in communication with the indexing server 130. The dynamic index purging module 134 of the indexing server 130 may be used to manage the size of the dynamic index 142 by purging updates from the dynamic index 142, in accordance to a routine, an example of which is illustrated in FIG. 4, and will be described below.

The electronic catalog server 106 may make the updates available for query by catalog update providers, or administrators of the electronic catalog server 106. For example, a query request may be input via a requestor computing device 102, and received by the electronic catalog server 106. The electronic catalog server 106 may then submit the request to the indexing server 130. The indexing server 130 may then, through the index collating module 132, respond to the request, as will be described in relation to FIG. 5 below.

Figure 2:
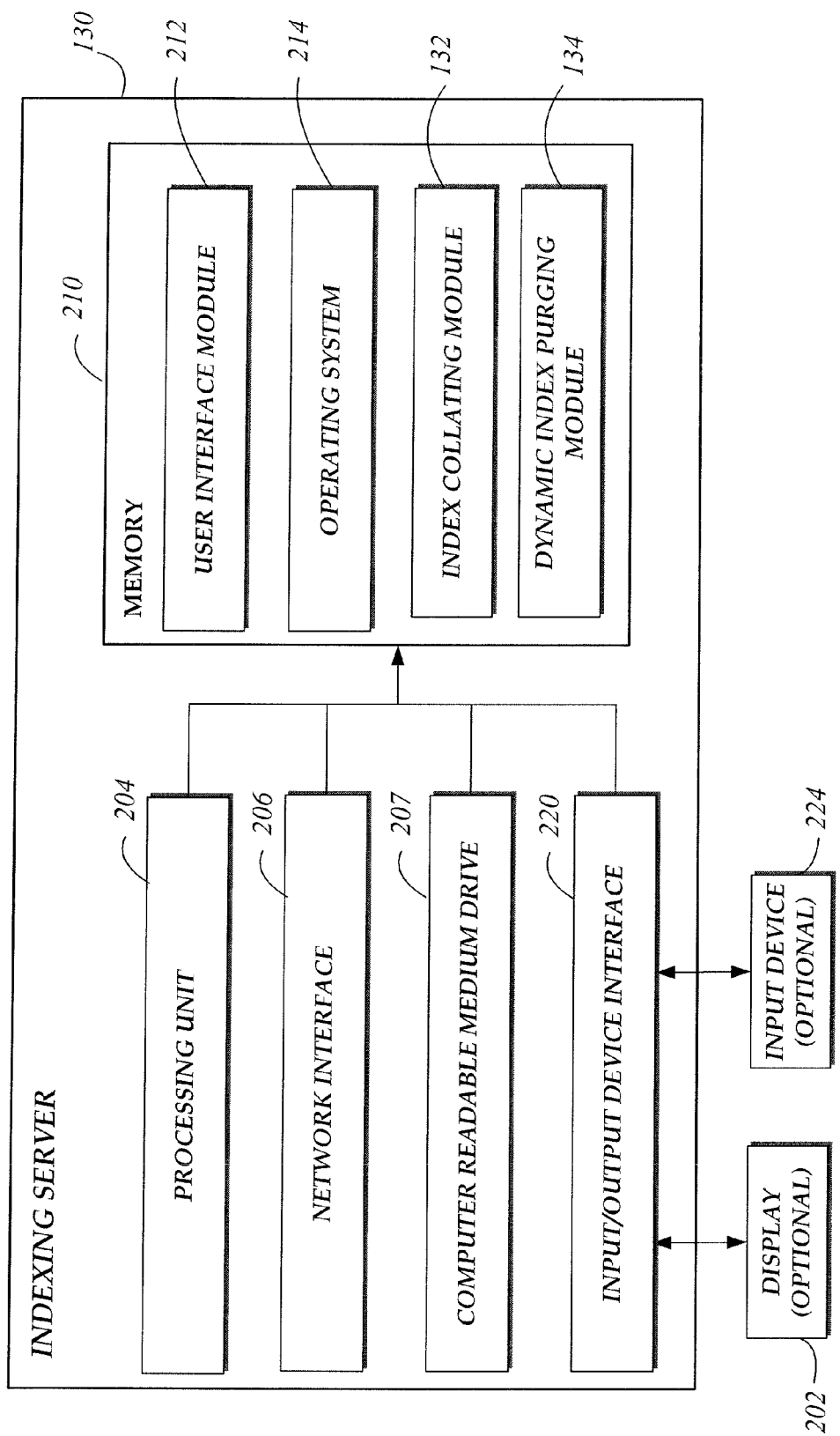
FIG. 2 depicts a general architecture of the indexing server shown in FIG. 1 for indexing data updates to an electronic catalog.

FIG. 2 depicts a general architecture of one embodiment of the indexing server 130. The indexing server 130 may include a processing unit 204, a memory unit 210, an optional display 202, an input/output device interface 220, an optional input device 224, a computer readable medium drive 207, and a network interface 206, all of which may communicate with one another by way of a communication bus. In one embodiment, the network interface 206 included in the indexing server 130 enables communication with one or more computer networks that connect to other computing devices in the environment 100. The processing unit 204 may thus receive information and instructions from other computing devices via the network interface 206. The processing unit 204 may also communicate to and from memory 210 and further provide output information for an optional display 202 via the input/output device interface 220. The input/output device interface 220 may also accept input from an optional input device 224, such as a keyboard, mouse, digital pen, touchscreen, etc.

The memory 210 may contain computer program instructions that the processing unit 204 executes in order to implement one or more embodiments. The memory 210 generally includes RAM, ROM, and/or other persistent, non-transitory computer-readable media. The memory 210 may store an operating system 214 that provides computer program instructions for use by the processing unit 204 in the general administration and operation of the indexing server 130. The memory 210 may further include computer program instructions and other information for implementing aspects of the present disclosure. For example, in one embodiment, the memory 210 includes a user interface module 212 that generates user interfaces (and/or instructions therefor) for display upon a computing device, e.g., via a navigation interface such as a web browser installed on the computing device. In addition to the user interface module 212 and operating system 214, the memory 210 may include an index collating module 132 and a dynamic purging module 134, discussed above in reference to FIG. 1, which may be executed by the processing unit 204.

While the indexing server 130 as depicted in FIG. 2 includes an arrangement of computer hardware and software components that may be used to implement aspects of the present disclosure, those skilled in the art will appreciate that the indexing server 130 may include many more (or fewer) components than those shown in FIG. 2. It is not necessary, however, that all of these generally conventional components be shown in order to provide an enabling disclosure. Those skilled in the art will also recognize that the querying server 110 may include some or all of the same components as the example indexing server 130 illustrated in FIG. 2.

Figure 3:
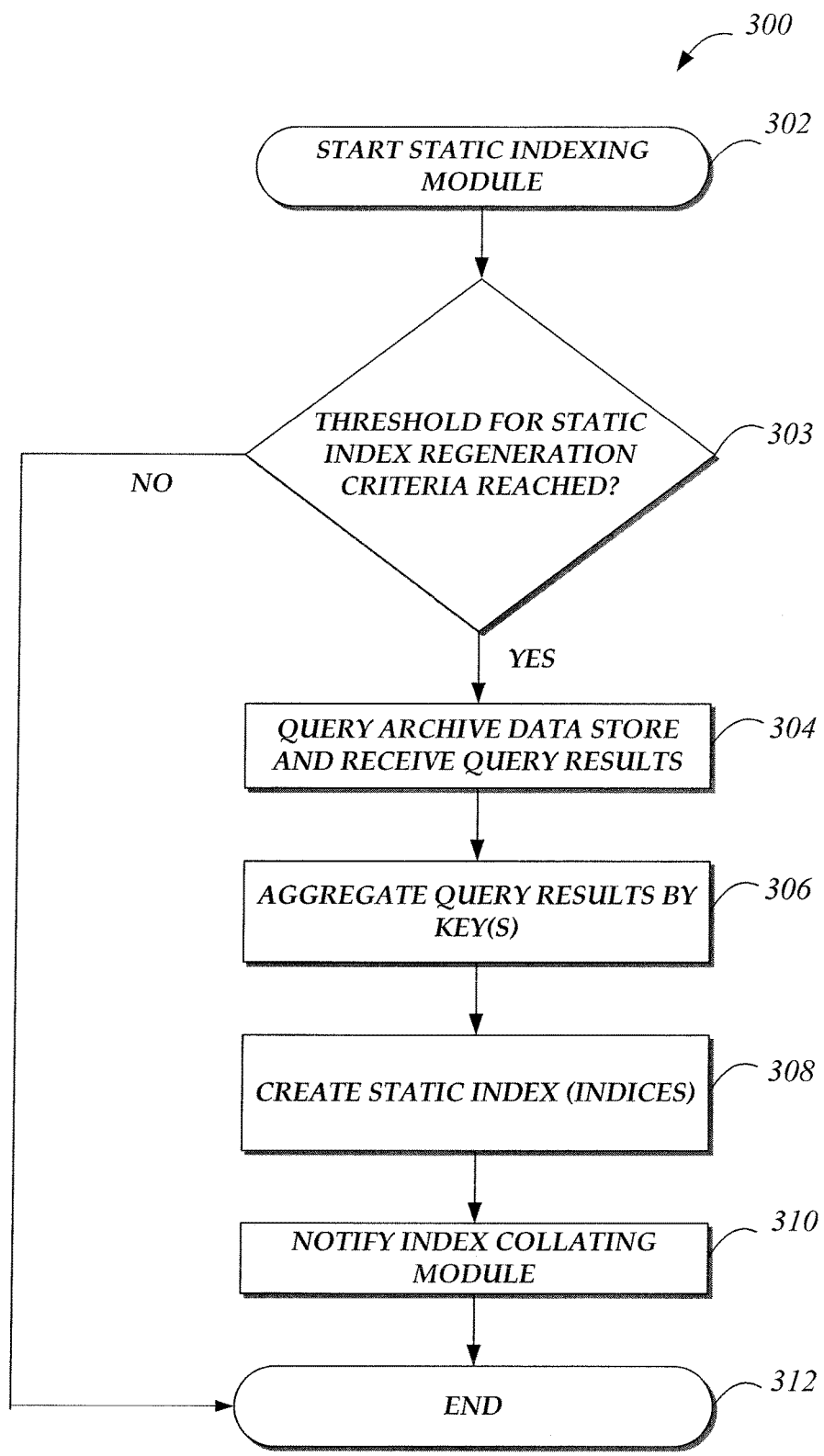
FIG. 3 is a flow diagram of an illustrative routine implemented by the querying server for generating and updating a static index of data updates to an electronic catalog.

FIG. 3 is a flow diagram of an illustrative routine 300 implemented by the static indexing module 112 for generating and updating one or more static indices based on the updates archived in archive data store 120. The routine 300 is described in terms of a system in which updates are stored in one or more data stores, such as archive data store 120. As discussed above, the update records are appended and stored as collections of records, or objects. The records may each include a value, which may correspond to the update made to an item of the electronic catalog. In addition, the records may also have keys and pointers associated with each of them. A key may correspond to a category of item and/or update associated with a particular record. Each update may have several types of keys assigned to it. For example, an item on the electronic catalog may be a nonfiction book, and an update to the price of the nonfiction book may have been made on Jan. 1, 2011. The record corresponding to the update to the price of the book on that date may have one key corresponding to the type of item being a book, another key corresponding to the genre of the book being nonfiction, another key corresponding to the update corresponding to a price update, and yet another key corresponding to the update having been made on the given date. Each record may have one or more of the keys described, or other keys for other types of categories of items and/or updates. The pointers associated with each record enable the record to be located within an object, within the archive data store 120. By using the identifiers or pointers, it is possible to only decompress a specific record within the collections of records archived.

The illustrative routine 300 begins at block 302, then proceeds to decision block 303, where it is determined whether a static index 122 needs to be generated or regenerated. As the archive data store 120 receives more updates from the electronic catalog server 106, and/or from the live data store 140, there may be a need to create and/or update the static indices 122 built as well. In various embodiments, the static index or indices are regenerated, and regeneration may be on a periodic or aperiodic basis, or may be interrupt driven. In some embodiments, the regeneration of each static index may be independent of other indices, while in other embodiments, all static indices may be regenerated at the same time. The periodic basis for index regeneration may be a time interval between static index generations, such hourly, daily, weekly, and the like. The periodic basis may also be a rolling basis where right after all static indices by a first to a last key are generated, the indices are regenerated starting from the first key again. The basis upon which static indices are regenerated is generally policy based, depending on the application for which the indexing would be used.

If, at decision block 303, it is determined that the criteria for regeneration has been reached, the routine moves to block 304. Otherwise, the routine ends at block 312. In between the creation of the static index 122, and the regeneration of the static index, if there are more updates received by the electronic catalog server 106, the updates may be indexed by a dynamic indexing module on the live data store 142 and stored in a dynamic index 142 on the live data store. The updates indexed in the dynamic index 142 may be kept in the dynamic index 142 until those updates are archived in the archive data store 120 and have subsequently been indexed by the static indexing module 112. The index collating module 132 enables the transparent use of the two types of indices, as is described in further detail in relation to FIG. 5 below.

Then, at block 304, the static indexing module 112 queries the archive data store 120. The query is aimed at generating a static index for a specific type of key. As disclosed in the '017 application, the query may be managed by creating a job-controlled query request store to provide persistence in the item data updates for managing queries and other metadata associated with the collections of records stored on the archive data store 120. In some embodiments, the metadata associated with the records may be updated to reflect the query request received. A server cluster (not shown) may also be initiated to operate a query in parallel with the archiving activities of the archive data store 120. The cluster then serves as the processor of the query. This enables the query to be executed without affecting the performance of the electronic catalog server 106. After the cluster is initiated, the query request may be translated into the appropriate format to interact with the archive data store 120. Once the query received is translated to the appropriate format, the query is executed and query results are received from the archive data store 120.

Once the query results are received by the static indexing module 112, the results are aggregated by the key at block 306. As described above, the records of updates may be keyed by one or several types of keys. The query results received are in response to a query for a specific type of key or keys, and therefore, the query results are aggregated based on the specific key(s). For example, the query request may be to find all updates associated with books, to find all updates associated with nonfiction books, or to find all updates performed on a specific date or over a specific interval of time, or other categories of items or updates. The query results received may thus be aggregated for books, for nonfiction books, for updates on a given date or a given time period, and the like. The aggregation of the query results may in some cases also include de-duplication of data from the objects retrieved. For example, a query request may include a request of the price history of an item over a period of one month. The information retrieved may include the price history of all items on a particular day, and also price history of items on all days, including days where the price history of the given item was not changed. Therefore, the aggregation of query results might include filtering out the records associated with other items during that period. The aggregation may also include removing records of the item on consecutive time periods where the price was not changed.

Once the query results are aggregated by key(s), one or more static indices 122 are created at block 308. In some embodiments, each static index 122 may be a read-only database or read-only object stored in the archive data store 120, wherein the key associated with the object in the static index 122 is the key by which the results were aggregated, and the value of the object in the static index 122 is a pointer, wherein the pointer may point to the location of the object within the archive data store 120. Continuing with the example above, the archive data store 120 may be queried for all updates pertaining to nonfiction books. When the query results are received, the static indexing module 112 may create an object in the static index 122 with the key being nonfiction books, with values corresponding to all a pointers to the object stored in the archive data store 120 corresponding to all updates to nonfiction books. Therefore, once such a static index 122 is created, if an administrator of the system later submits a query regarding updates to all nonfiction books, instead of scanning all the update records stored in archive data store 120 to locate the records associated with nonfiction books, the system would instead only need to locate a static index 122 by the key of nonfiction books among all static indices 122 created, and thereafter return the location of the object associated with that key, and then, if desired, retrieve only the update records of that object, as will be explained further in relation to FIG. 5 below.

Therefore, the creation of the static indices 122 allows the collections of records or objects stored in the archive data store 120 to be queried more efficiently, without having to scan all the objects in the archive data store 120. Rather, only the static indices 122, which have aggregated results by keys are queried, and the results of such queries can be used to then locate the relevant object records in the archive data store. The static indices created may also, in some embodiments, be compressed and encrypted. Such a static indexing scheme allows several millions and even billions of update records to be queried with minimal random-access memory (RAM) requirements, and in little time, in the order of about 100 ms or less, in some embodiments.

Once one or more static indices 122 are generated at block 308, the static indexing module 112 may, at block 310, communicate with the index collating module 132 to notify of the availability of the static index/indices 122. In some embodiments, a Bloom filter may be created in conjunction with the static index/indices 122. A Bloom filter helps to optimize the use of the indices by providing, in response to a query request from a user based on a key, an indication of whether the key exists in the index without searching the index.

It will be appreciated that certain blocks described above can be performed in a different order without affecting the objective or results achieved by the static indexing module 112. Alternatively, the blocks can be combined and performed in a single block. Other modifications are possible to achieve the same results without departing from the scope of the present disclosure.

FIG. 4 is a flow diagram of an illustrative routine 400 implemented by the dynamic index purging module 134 for maintenance of a dynamic index 142 of updates to an electronic catalog. The dynamic index 142 is beneficial during interim periods where the received updates are not yet stored in the archive data store 120, and/or during periods where they are already stored in the archive data store 120, but not yet indexed by the static indexing module 112. The dynamic index purging module 134 enables a reduction of the storage requirements of the dynamic index 142 by periodically purging portions or all of the dynamic index 142. The routine 400 is described in terms of a system in which updates are stored in one or more data stores, such as a live data store 140 before being archived. The routine 400 may be performed on a periodic basis (e.g., based on a time period determined by the administrator of the indexing server 130) or aperiodic basis. In other embodiments, the routine 400 may be interrupt driven. For example, the routine 400 may be performed if the live data store 140 starts running out of storage space, in which case the dynamic index 142 may need to be purged. In other embodiments, the routine 400 may be run each time a new static index 122 is generated.

The illustrative routine 400 begins at block 402, then proceeds to block 404, where the dynamic index purging module 134 obtains the dynamic index 142 from the live data store 140. The dynamic index 142 may, in various embodiments, include a list of update records stored in the live data store 140. The dynamic index 142 may be a flat file, a table, a database table, or any other type of index. The dynamic index 142 may also organize the updates stored on the live data store according to keys associated with the updates. As explained above, the keys may represent a category associated with the update and/or the item associated with the item. After the dynamic index 142 stored on the live data store 140 is received by the dynamic index purging module 134, the routine moves to decision block 406, where the dynamic index purging module 134 verifies whether the updates indexed by the dynamic index 142 have been indexed by one or more static indices 122. In some embodiments, this determination may be based on the keys and/or values associated with the updates. If it is determined at decision block 406 that the updates are indexed by a static index 122, then, at block 408, the dynamic index purging module 402 instructs the live data store 140 to purge the updates in the dynamic index 142. In various embodiments, the purged updates may be some or all of the updates index by the dynamic index 142. If, however, it is determined at decision block 406 that some or all of the updates are not yet indexed by a static index 122, then, at block 410, the dynamic purging module 402 may communicate with the index collating module 132 to notify it of the availability of the dynamic index 142. As with the static indices, in some embodiments, a Bloom filter may be created in conjunction with the dynamic index 142. A Bloom filter helps to optimize the use of the indices by providing, in response to a query request from a user based on a key, an indication of whether the key exists in the index without searching the index. The routine then ends at block 412.

Figure 5A:
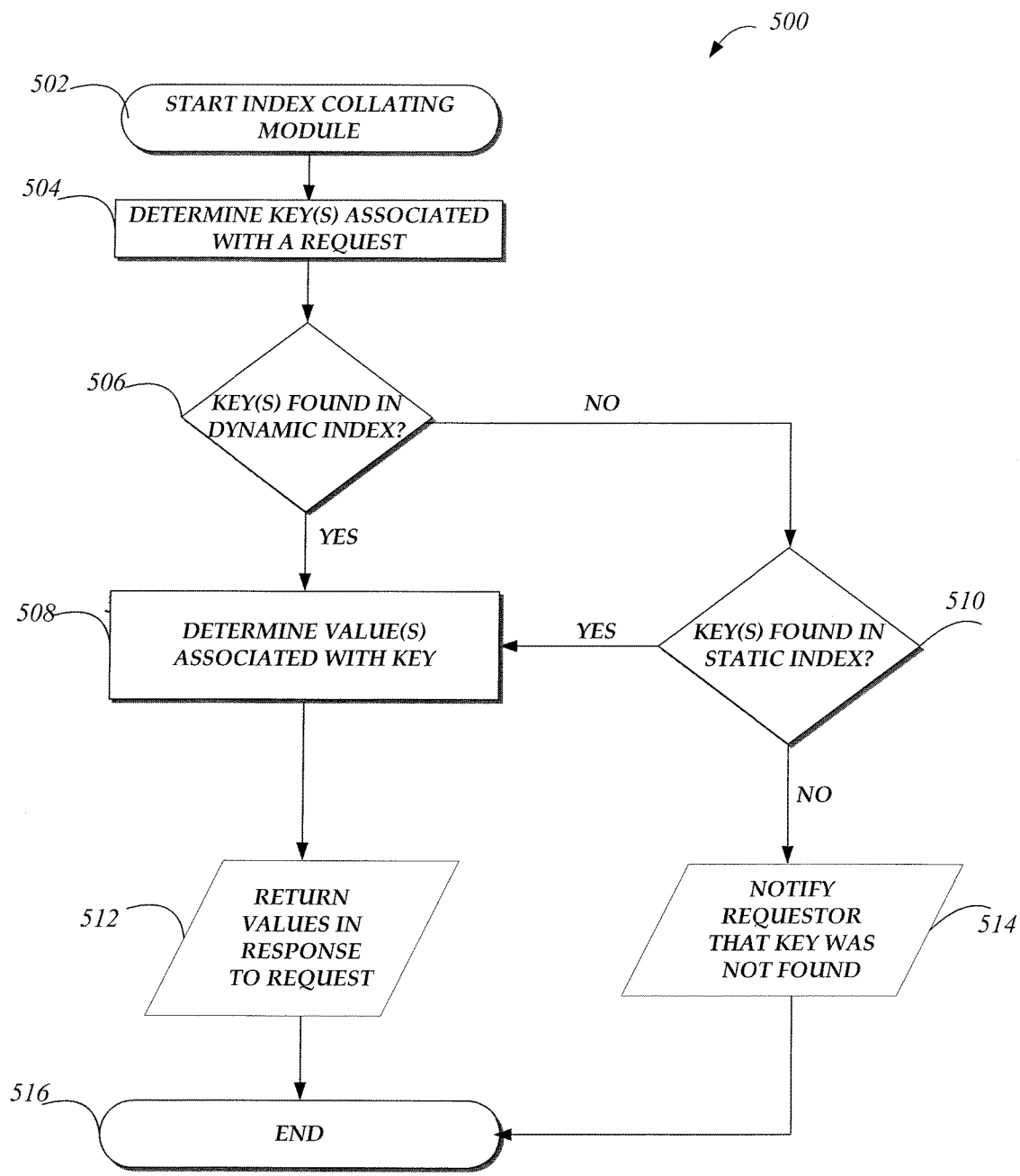
FIGS. 5A-5C are flow diagrams of illustrative routines implemented by the indexing server for responding to a request for updates to items an electronic catalog using the static index and the dynamic index.
Figure 5B:
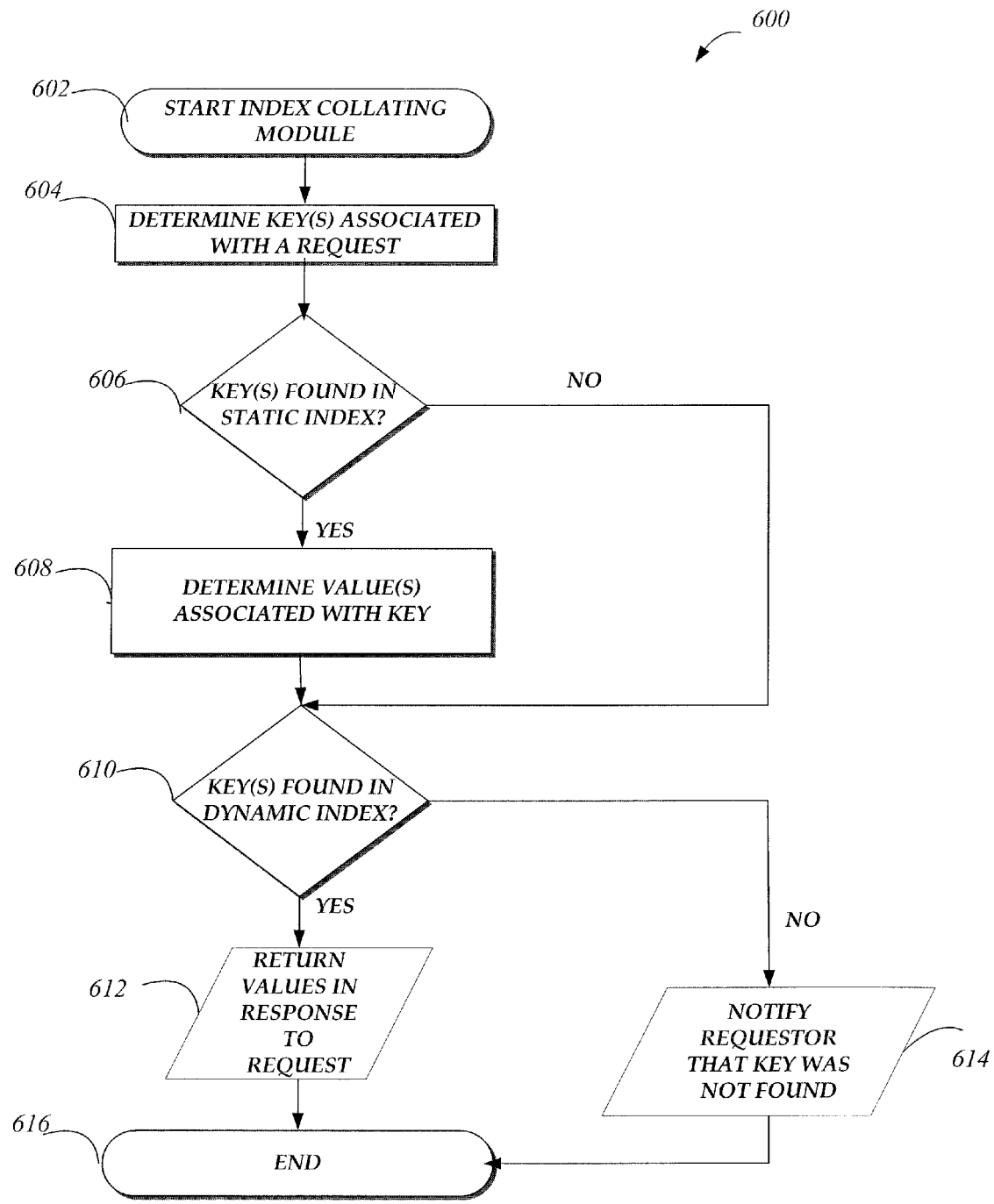
Figure 5C:
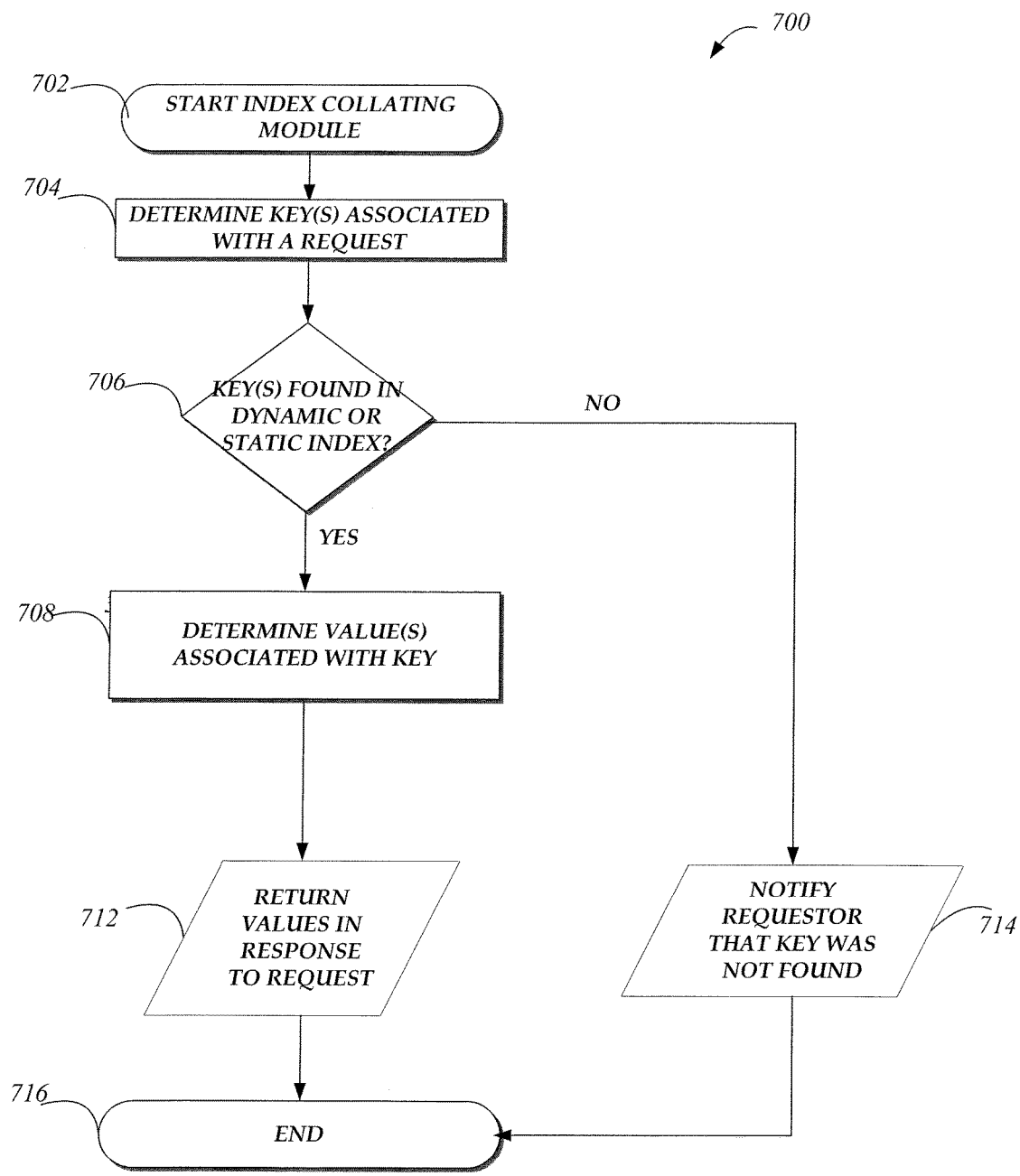

FIGS. 5A-5C are flow diagrams of illustrative routines 500, 600, and 700 implemented by the index collating module 132 for responding to a request for updates to items of the electronic catalog. As described above, there may be situations where a user or administrator of the electronic catalog server 106, or an application in communication with the electronic catalog server 106 may submit a query regarding updates to the electronic catalog items in the form of a request. The updates may then be used for performing various types of analysis regarding historical variations of item attributes, for troubleshooting the origin of bad records, and the like. In some embodiments, the user, administrator, or application may submit such query requests through a requestor computing device 102. In other embodiments, a query request may be submitted via a call to an application programming interface ("API"). The request may be received by the electronic catalog server 106 and then communicated to the indexing server 130.

Referring to FIG. 5A, the illustrative routine 500 begins at block 502, then proceeds to block 504, where the index collating module 132 receives the query request and determines the key or keys associated with the request. As described above, an example query may be to determine all updates performed on a given date. In such an example, the date is the key associated with the request. Once the key is determined, the index collating module 132 determines whether the key is found in the dynamic index 142 at decision block 506. If the key is found in the dynamic index 142 at block 506, then the routine moves to block 508. If the key is not found in the dynamic index 142 at block 506, then the routine moves to decision block 510, and the index collating module 132 determines if the key is found in one of the static indices 122. If the key is found in a dynamic index 142 or in a static index 122, then at block 508, the index collating module 132 determines the value(s) associated with the key. As described above, the value in the static index 122 may be a pointer pointing to the location of the object in the archive data store 120. For example, the static index 122 may have a pointer to an object containing all updates provided on the given date. The value in the dynamic index 142 may be the update itself. Then, at block 512, the values, and/or pointers, may be returned by the index collating module 132 in response to the query. The index collating module 132 thus returns the updates or pointers to the objects from both indices, which is transparent to the requestor. In other words, the requestor need not separately query the live data store 140 and the archive data store 120 in order to retrieve the requested updates. Additionally, since the search is only based on the retrieval of the index files at first, instead of searching through all update records, the response to the search query can be provided more efficiently and quickly. If the key is found in the dynamic index 142, the index collating module 132 need not query the static indices 122, since the most recent version of the update will be available in the dynamic index 142. Also, in some embodiments, if Bloom filters are created for one or more of the static and dynamic indices, the index collating module 132 may determine that one or more of the static and dynamic indices need not be searched, thereby optimizing the query response speed.

The response, including the updates in the live data store 140 and the pointers to the objects in the archive data store 120 may then be sent to the electronic catalog server 106 to forward on to the requestor computing device 102. Upon receipt, the requestor may submit another request to receive the updates included in the object pointed to by the pointer. The index collating module 132 may then retrieve the relevant update records from the archive data store 120 and return those to the requestor via the electronic catalog server 106. In some embodiments, the index collating module 132 may automatically retrieve the updates pointed by the pointers before returning the response to the requestor.

If the key is not found in a static index 122 at block 510, then the index collating module 132 notifies the requestor that the key was not found at block 514. As in the above, the response may be sent to the electronic catalog server 106 to forward on to the requestor computing device. A key may not be found in the indices if, for example, a requestor wants to find updates provided to an item which does not exist in the electronic catalog.

Referring to FIG. 5B, the illustrative routine 600 begins at block 602, then proceeds to block 604, where the index collating module 132 receives the query request and determines the key or keys associated with the request. Once the key is determined, the index collating module 132 determines whether the key is found in one or more of the static indices 122 at decision block 606. If the key is found in a static index 122 at block 606, then the routine moves to block 608. If the key is not found in a static index 122 at block 606, then the routine moves directly to decision block 610. If the key is found in a static index 122, then at block 608, the index collating module 132 determines the value(s) associated with the key in the static index 122. Then, whether or not the key was found in the static index 122, the index collating module 132 determines, at block 610, if the key is also found in the dynamic index 142, in order to ensure that the most recent updates which may not have been indexed in a static index 122 are not missed. Then, at block 612, the values, and/or pointers, may be returned by the index collating module 132 in response to the query. The index collating module 132 thus returns the updates or pointers to the objects from both indices, which is transparent to the requestor. As described above, in some embodiments, if Bloom filters are created for one or more of the static and dynamic indices, the index collating module 132 may determine that one or more of the static and dynamic indices need not be searched, thereby optimizing the query response speed.

The response, including the updates in the live data store 140 and the pointers to the objects in the archive data store 120 may then be sent to the electronic catalog server 106 to forward on to the requestor computing device 102. Upon receipt, the requestor may submit another request to receive the updates included in the object pointed to by the pointer. The index collating module 132 may then retrieve the relevant update records from the archive data store 120 and return those to the requestor via the electronic catalog server 106. In some embodiments, the index collating module 132 may automatically retrieve the updates pointed by the pointers before returning the response to the requestor.

If the key is not found in a dynamic index 142 at block 612, then the index collating module 132 notifies the requestor, at block 614, that the key was not found. As in the above, the response may be sent to the electronic catalog server 106 to forward on to the requestor computing device. A key may not be found in the indices if, for example, a requestor wants to find updates provided to an item which does not exist in the electronic catalog.

Referring to FIG. 5C, the illustrative routine 700 begins at block 702, then proceeds to block 704, where the index collating module 132 receives the query request and determines the key or keys associated with the request. Once the key is determined, the index collating module 132 determines whether the key is found in one or more of the static indices 122 and/or the dynamic index 142 at decision block 706. If the key is found in one or more of the indices, then the routine moves to block 708. If the key is not found in either index, then the routine moves to block 714. At block 708, the index collating module 132 determines the value(s) associated with the key in the static index 122 and/or the dynamic index 142 by aggregating the results found in both indices. Then, at block 712, the values, and/or pointers, may be returned by the index collating module 132 in response to the query. The index collating module 132 thus returns the updates or pointers to the objects from both indices, which is transparent to the requestor. As described above, in some embodiments, if Bloom filters are created for one or more of the static and dynamic indices, the index collating module 132 may determine that one or more of the static and dynamic indices need not be searched, thereby optimizing the query response speed.

The response, including the updates in the live data store 140 and the pointers to the objects in the archive data store 120 may then be sent to the electronic catalog server 106 to forward on to the requestor computing device 102. Upon receipt, the requestor may submit another request to receive the updates included in the object pointed to by the pointer. The index collating module 132 may then retrieve the relevant update records from the archive data store 120 and return those to the requestor via the electronic catalog server 106. In some embodiments, the index collating module 132 may automatically retrieve the updates pointed by the pointers before returning the response to the requestor.

If the key is not found in either index at block 706, then the index collating module 132 notifies the requestor, at block 714, that the key was not found. As in the above, the response may be sent to the electronic catalog server 106 to forward on to the requestor computing device. A key may not be found in the indices if, for example, a requestor wants to find updates provided to an item which does not exist in the electronic catalog.

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes, including but not limited calculation processes, described herein may be embodied in, and fully automated via, software code modules executed by one or more general purpose computers or processors. The code modules may be stored in any type of computer-readable medium or other computer storage device. Some or all the methods may alternatively be embodied in specialized computer hardware. In addition, the components referred to herein may be implemented in hardware, software, firmware or a combination thereof.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A computer-implemented method for managing update information associated with items of an electronic catalog, comprising:

under control of one or more computing devices:
obtaining, from an archive data store, updates associated with an indexing key, wherein the updates comprise a change associated with an item of an electronic catalog, wherein at least a subset of the updates is purged from a live data store to the archive data store, and wherein the live data store is associated with a dynamic index that indexes the subset before the subset is purged;
aggregating the updates into an object;
indexing the updates in a static index of the archive data store by associating a pointer to the object with the indexing key in the static index;
obtaining a request for update data associated with the electronic catalog, wherein the request for update data includes a query key that is matched to determine whether the update can be obtained from the static index or the dynamic index; and
generating a response to the request based, at least in part, on a match to the indexing key on the static index, wherein the response includes the pointer to the object, wherein the pointer corresponds to the match to the indexing key.

2. The computer-implemented method of claim 1, wherein the generation of the response is further based on the dynamic index of the live data store.

3. The computer-implemented method of claim 2, wherein the response further includes at least an update indexed by the dynamic index after the purging of the subset of updates from the live data store to the archive data store.

4. The computer-implemented method of claim 1, wherein the request includes a request key.

5. The computer-implemented method of claim 4, wherein the request key corresponds to the indexing key.

6. The computer-implemented method of claim 4, wherein generating the response comprises comparing the request key against one or more keys included in the static index.

7. The computer-implemented method of claim 1 further comprising compressing the object.

8. A system comprising:
a data store configured to at least store computer-executable instructions; and
a hardware processor in communication with the data store, the hardware processor configured to execute the computer-executable instructions to at least:
aggregate updates associated with an indexing key into an object, wherein the updates are archived in an archive data store and comprise a change associated with an item of an electronic catalog, wherein at least a subset of the updates is purged from a live data store to the archive data store, and wherein the live data store is associated with a dynamic index that indexes the subset;
index the updates in a static index of the archive data store by associating a pointer to the object with the indexing key in the static index;
obtain a request for data associated with the electronic catalog, wherein the request for update data includes a query key that determines whether the update can be obtained from the static index or the dynamic index; and
generate a response to the request based, at least in part, on a match to the indexing key on the static index, wherein the response includes the pointer to the object, wherein the pointer corresponds to the match to the indexing key.

9. The system of claim 8, wherein the hardware processor is further configured to execute the computer-executable instructions to receive a query for the updates, wherein the query indicates the indexing key, the indexing key serving as a basis for creating the static index.

10. The system of claim 9, wherein the static index is created asynchronously with receiving the query for the updates.

11. The system of claim 8, wherein the static index is recreated when a threshold for index recreation has been exceeded.

12. The system of claim 11, wherein the threshold for index recreation is a time period.

13. The system of claim 8, wherein the static index is recreated periodically, aperiodically, or on an interrupt-driven basis.

14. The system of claim 8, wherein the pointer to the object references a location of the object in the archive data store.

15. A non-transitory computer: readable storage medium storing computer executable instructions that when executed by a processor perform operations comprising:
aggregating updates associated with an indexing key into an object, wherein the updates are archived in an archive data store and comprise a change associated with an item of an electronic catalog;
indexing the updates in a static index of the archive data store by associating a pointer to the object with the indexing key in the static index;
in response to verifying that the static index comprises updates indexed by a dynamic index of a live data store, purging such updates from the dynamic index;
obtaining a request for data associated with the electronic catalog, wherein the request for update data includes a query key that is matched to determine whether the update can be obtained from the static index or the dynamic index; and
generating a response to the request based, at least in part, on a match to the indexing key on the static index, wherein the response includes the pointer to the object, wherein the pointer corresponds to the match to the indexing key.

16. The non-transitory computer-readable storage medium of claim 15, wherein the indexing key comprises a category associated with the updates.

17. The non-transitory computer-readable storage medium of claim 16, wherein the category comprises at least one of a time period or a type of item in the electronic catalog.

* * * * *